(12) United States Patent
Dopfer et al.

(10) Patent No.: US 10,760,433 B2
(45) Date of Patent: Sep. 1, 2020

(54) METHOD FOR INSPECTING A ROTOR BLADE UNIT

(71) Applicant: MTU Aero Engines AG, Munich (DE)

(72) Inventors: Manfred Dopfer, Unterschleissheim (DE); Martin Pernleitner, Dachau (DE); Gottfried Schuetz, Tutzing (DE)

(73) Assignee: MTU Aero Engines AG, Munich (DE)

( * ) Notice: Subject to any disclaimer, the term of this patent is extended or adjusted under 35 U.S.C. 154(b) by 709 days.

(21) Appl. No.: 15/367,557

(22) Filed: Dec. 2, 2016

(65) Prior Publication Data

US 2017/0159458 A1 Jun. 8, 2017

(30) Foreign Application Priority Data

Dec. 4, 2015 (DE) .................. 10 2015 224 375

(51) Int. Cl.
| | | |
|---|---|---|
| *F01D 5/22* | (2006.01) | |
| *G01M 5/00* | (2006.01) | |
| *F01D 5/12* | (2006.01) | |
| *B64F 5/60* | (2017.01) | |
| *B64D 27/10* | (2006.01) | |
| *F01D 5/02* | (2006.01) | |
| *F01D 5/14* | (2006.01) | |
| *F04D 29/32* | (2006.01) | |
| *F01D 21/00* | (2006.01) | |

(52) U.S. Cl.
CPC ............ *F01D 5/225* (2013.01); *B64D 27/10* (2013.01); *B64F 5/60* (2017.01); *F01D 5/02* (2013.01); *F01D 5/12* (2013.01); *F01D 5/147* (2013.01); *F04D 29/324* (2013.01); *G01M 5/005* (2013.01); *G01M 5/0016* (2013.01); *F01D 21/003* (2013.01); *F05D 2220/323* (2013.01); *F05D 2230/10* (2013.01); *F05D 2230/72* (2013.01)

(58) Field of Classification Search
None
See application file for complete search history.

(56) References Cited

U.S. PATENT DOCUMENTS

| | | | | | |
|---|---|---|---|---|---|
| 4,128,929 | A | * | 12/1978 | DeMusis ................. | B23P 6/002 29/402.18 |
| 4,333,239 | A | | 6/1982 | Arrigoni et al. | |

(Continued)

FOREIGN PATENT DOCUMENTS

WO WO2014/008088 1/2014

*Primary Examiner* — Igor Kershteyn
*Assistant Examiner* — Juan G Flores
(74) *Attorney, Agent, or Firm* — Davidson, Davidson & Kappel, LLC

(57) ABSTRACT

A method for inspecting a rotor blade unit of a gas turbine, the rotor blade unit including a radially outwardly disposed outer shroud connected by a material-to-material bond to a radially inwardly adjoining rotor blade. The method includes: providing a rotor blade unit; processing the outer shroud at its axially forward or axially aft side, the side selected to be processed being the one that has a greater distance from the adjacent axial leading edge or axial trailing edge of the rotor blade, a contact surface being formed by processing the selected side; providing the rotor blade unit having the contact surface in a measuring device, in particular a measuring device for determining the torsion or twist of the rotor blade unit about an axis.

17 Claims, 1 Drawing Sheet

(56) References Cited

U.S. PATENT DOCUMENTS

| | | | | |
|---|---|---|---|---|
| 4,533,298 | A * | 8/1985 | Partington | F01D 5/225 |
| | | | | 416/191 |
| 4,718,172 | A * | 1/1988 | Rouse | G01B 5/24 |
| | | | | 33/530 |
| 5,238,366 | A * | 8/1993 | Ferleger | F01D 21/003 |
| | | | | 415/118 |
| 6,532,656 | B1 | 3/2003 | Wilkins et al. | |
| 7,114,339 | B2 * | 10/2006 | Alvanos | F01D 5/081 |
| | | | | 60/806 |
| 9,109,455 | B2 * | 8/2015 | Chouhan | F01D 5/225 |
| 2010/0288052 | A1 | 11/2010 | Tanaka et al. | |
| 2015/0118031 | A1 | 4/2015 | Bindingnavale et al. | |

\* cited by examiner

METHOD FOR INSPECTING A ROTOR BLADE UNIT

This claims the benefit of German Patent Application No. DE10 2015 224 375.3, filed Dec. 4, 2015 and hereby incorporated by reference herein.

The present invention relates to a method for inspecting a rotor blade unit of a gas turbine, in particular an aircraft gas turbine, the rotor blade unit including a radially outwardly disposed outer shroud which is connected by a material-to-material bond, in particular integrally, to a radially inwardly adjoining rotor blade, the rotor blade having an airfoil including a pressure side and a suction side, as well as an axial leading edge and an axial trailing edge which interconnect the pressure side and the suction side.

In the present patent application, directional words such as "axial," "axially," "radial," "radially," and "circumferential" are always taken with respect to the gas turbine engine axis, unless explicitly or implicitly indicated otherwise by the context. Similarly, the terms "forward," "leading," "aft," and "trailing" are taken with respect to the direction of the main flow in the turbomachine, unless explicitly or implicitly indicated otherwise by the context.

BACKGROUND

Inspection methods for rotor blades of a gas turbine are in particular used for quality assurance during manufacture, but also during maintenance and servicing. Particularly in the case of aircraft gas turbines, so-called "pretwist measurements" are performed on the rotor blade units. To be able to perform such measurements and inspections, the rotor blade unit must be provided with contact surfaces to allow for referenced positioning of the rotor blade unit in a suitable measuring device. Until now, such contact surfaces have been formed on the outer shroud at an axially aft side very close to the axial trailing edge of the rotor blade. This approach of providing a contact surface has involved the problem of the trailing edge being affected, in particular damaged, during the formation of the contact surface. Damage to the leading edge or trailing edge of the rotor blade is, on the one hand, difficult and costly to repair and, on the other hand, if the damage should not be noticed, a damaged leading or trailing edge has a negative effect on the efficiency of the gas turbine.

SUMMARY OF THE INVENTION

It is an object of the present invention to overcome the drawbacks mentioned above.

It is proposed to achieve this object using a method including the following steps: providing a rotor blade unit; processing the outer shroud at its axially forward or axially aft side, the side selected to be processed being the one that has a greater distance from the adjacent axial leading edge or axial trailing edge of the rotor blade, a contact surface being formed by processing the selected side; providing the rotor blade unit having the contact surface in a measuring device, in particular a measuring device for determining the torsion or twist of the rotor blade unit about an axis, in particular about a stacking axis or a longitudinal axis of the rotor blade.

The proposed method allows rotor blade units to be optimally processed for a particular type of gas turbine, in each case to form a contact surface for a subsequent measurement, in particular a pretwist measurement, while at the same time minimizing the risk of damage to the leading edge or trailing edge of the rotor blade.

With respect to the selection of the axial side of the outer shroud, it is preferred that the contact surface be formed on the axially forward side of the outer shroud. Generally, an axial overhang of the outer shroud is greater at the axially forward side than the axial overhang at the axially aft side, which makes it possible to minimize the risk of the rotor blade, in particular its leading edge, being damaged during the formation of a contact surface on the axially forward side of the outer shroud.

The processing of the outer shroud is preferably performed using a machining process, in particular milling or grinding.

It is further proposed to process the outer shroud in such a way that the contact surface is axially spaced apart from the axial leading edge of the rotor blade. In other words, an axial overhang of the outer shroud over the leading edge or trailing edge of the rotor blade is only partially removed, thereby further reducing the risk of damage to the rotor blade.

It is also proposed that the non-selected side of the outer shroud remain unprocessed. In the preferred case where the contact surface is formed on the axially forward side of the outer shroud, the axially aft side of the outer shroud remains unprocessed. In particular, the rotor blade unit, which is generally produced by casting, may retain its original cast surface at the non-processed side of the outer shroud.

The method can be used during the manufacture of a gas turbine or/and during the maintenance of a gas turbine.

The present invention also provides a rotor blade unit having a radially outwardly disposed outer shroud which is connected by a material-to-material bond, in particular integrally, to a radially inwardly adjoining rotor blade, the rotor blade having an airfoil including a pressure side and a suction side, as well as an axial leading edge and an axial trailing edge which interconnect the pressure side and the suction side, the outer shroud having a machined contact surface at its axially forward or axially aft side, the contact surface being formed at that side which has a greater distance from an adjacent axial leading edge or axial trailing edge of the rotor blade.

In this connection, it is preferred that the contact surface be formed on the axially forward side of the outer shroud.

It is further proposed that the rotor blade be connected radially inwardly to a root portion, in particular by a material-to-material bond, the root portion preferably being configured as a fir-tree root and adapted to connect the rotor blade unit to a rotor disk of the gas turbine, in particular by interlocking fit.

Further, the present invention relates also to a gas turbine, in particular an aircraft gas turbine, including at least one compressor stage and at least one turbine stage, the turbine stage having a turbine rotor including a plurality of rotor blade units arranged adjacent one another in the circumferential direction, and the compressor stage having a compressor rotor including a plurality of rotor blade units arranged adjacent one another in the circumferential direction, characterized in that the turbine rotor or/and the compressor rotor has/have at least one rotor blade unit having one of the features mentioned above.

BRIEF DESCRIPTION OF THE DRAWINGS

The present invention will now be described with reference to the accompanying figures by way of example and not by way of limitation.

DETAILED DESCRIPTION

Figure 1:
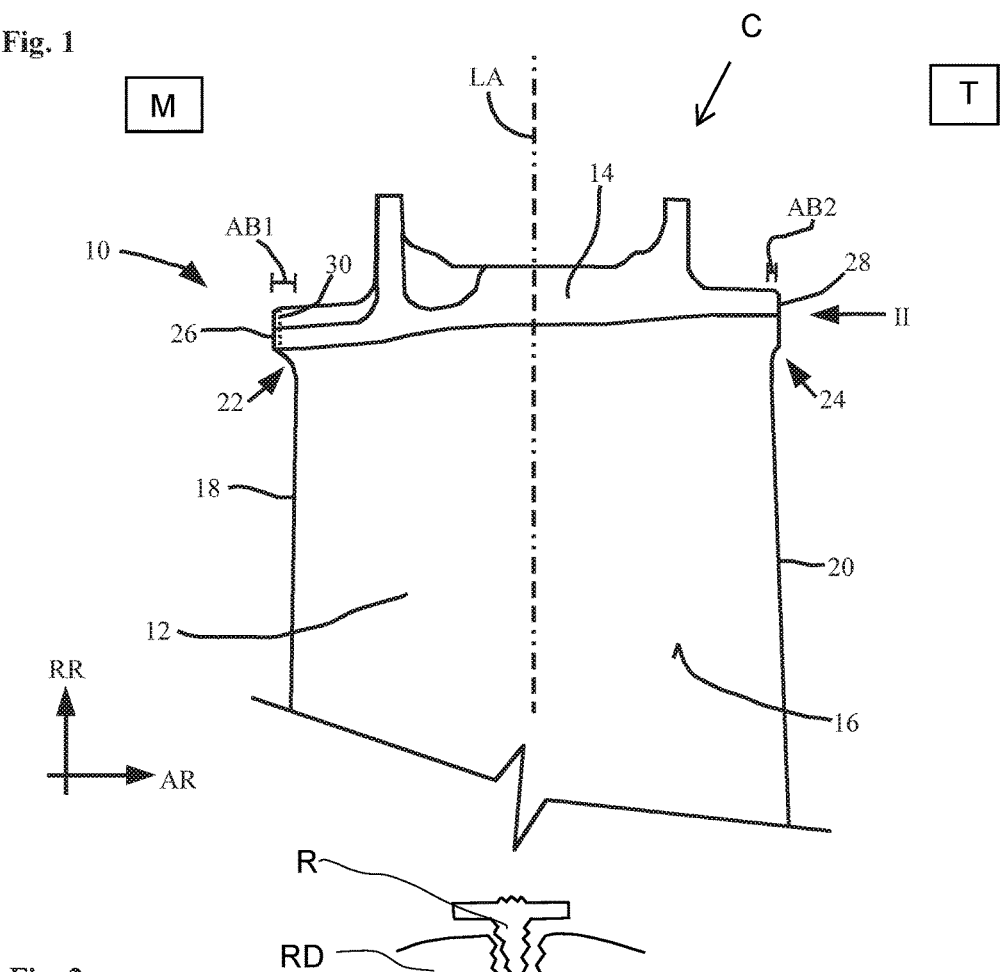
FIG. 1 is a simplified schematic view of a portion of a rotor blade unit including a radially outer shroud and a rotor blade.

FIG. 1 shows a rotor blade unit 10 in an elevation view looking in a circumferential direction. Rotor blade 10 includes a rotor blade 12 and an outer shroud 14 disposed outwardly in radial direction RR and connected to rotor blade 12. Rotor blade 12 has an airfoil including a pressure side 16 and a suction side (not shown in this view). The suction side and pressure side 16 are connected together by an axial leading edge 18 and an axial trailing edge 20.

Leading edge 18 and trailing edge 20 merge into outer shroud 14 at 22 and 24, respectively, in particular into a forward side 26 and an aft side 28, respectively. Forward side 26 and aft side 28 of outer shroud 14 extend in axial direction AR slightly beyond leading edge 18 and trailing edge 20, respectively, as indicated by the two distance-indicating lines AB1 and AB2. As can be seen from this view, distance AB1 is slightly greater than distance AB2. In order to prepare rotor blade unit 10 for a measurement, in particular a so-called pretwist measurement, to be performed during maintenance or during manufacture for quality assurance purposes, some material is removed at that side of outer shroud 14 which has a greater distance from its adjacent edge of rotor blade 12 in order to form a preferably flat contact or reference surface 30. In the view of FIG. 1, contact surface 30 is indicated by a dotted line at a distance from forward side 26. It should be noted that, for the sake of illustration, contact surface 30 is shown at a significant distance from forward side 26, while in reality, the material removal at forward side 26 for forming contact surface 30 may be in the (sub-) millimeter range. The actual contact surface 30 formed by machining processes (material removal at forward side 26) is spaced from leading edge 18 of rotor blade 12 by a distance that is slightly smaller than distance AB1, but generally still greater than distance AB2. Reference symbol LA denotes a longitudinal axis of rotor blade unit 10.

The rotor blade unit 10 may be part of a compressor C upstream of a turbine T of an aircraft gas turbine, and may be connected via a root portion R to a rotor disk RD, all shown schematically.

Figure 2:
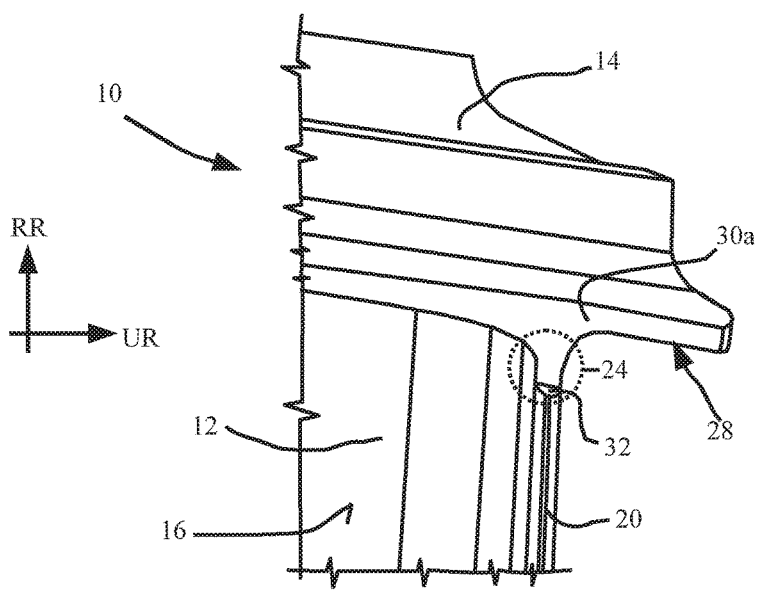
FIG. 2 is a simplified schematic perspective view of an axial trailing edge of a rotor blade, which trailing edge is damaged.

FIG. 2 is a simplified schematic perspective detail view of trailing edge 20 of a rotor blade unit 10, shown after aft side 28 of outer shroud 14 has been processed in a heretofore known manner, and looking in axial direction AR, as indicated approximately by arrow II in FIG. 1. A contact surface 30a has been formed by removing material at aft side 28. In this process, trailing edge 20 of rotor blade 12 has been damaged in the upper region, viewed in radial direction RR. The damage to trailing edge 20 is represented by the step 32 indicated in the transition region 24 between trailing edge 20 and aft side 28, which is encircled by a dotted line. In the case of a known rotor blade, such unwanted damage to trailing edge 20 can, in practice, occur during the grinding of aft side 28 of outer shroud 14, especially when tolerances have unfortunately added up during the manufacture of the rotor blade, which is generally produced by casting.

In order to prevent such damage to a leading edge 18 or a trailing edge 20 of a rotor blade, the method presented here provides for the material removal to be effected at that side of the outer shroud which has a greater distance from its adjacent rotor blade edge. The proposed method departs from the prior art practice of providing the contact surface always at the same side, generally aft side 28, of outer shroud 14 of rotor blade unit 10.

In the proposed method, a rotor blade unit 10 may be provided, for example, during initial manufacture after the rotor blade unit has been cast. The newly manufactured rotor blade unit 10 provided is examined to determine which side 26, 28 of outer shroud 14 is spaced by a greater distance from the corresponding edge 18, 20 of the rotor blade. At that side (forward side 26 in FIG. 1) which has the greater distance (AB1), contact surface 30 is then formed using, in particular, machining processes, such as milling or grinding. By formation of contact surface 30, rotor blade unit 10 is prepared for further inspections or examinations in a measuring device. The measuring device is in particular adapted to determine the torsion or twist of rotor blade unit 10 about a particular axis, such as, for example, the stacking axis or the longitudinal axis. Contact surface 30 is configured as a flat surface and does not have any deformations, deposits, or the like, resulting from operation, so that the required measurements can be performed on rotor blade unit 10 or rotor blade 12 by means of contact surface 30.

Alternatively, a rotor blade unit 10 may also be provided, for example, by disassembling a rotor blade ring of a turbine stage or a compressor stage of a gas turbine, in particular an aircraft gas turbine, and removing the individual rotor blade units for maintenance purposes. These rotor blade units are generally already provided with corresponding contact or reference surfaces. The used rotor blade units are then prepared for further inspections or examinations in a measuring device M (FIG. 1). This may include, in particular, the following steps: cleaning and, if necessary, inspecting and/or reworking of the contact surface. However, cleaning or reworking of the contact surface is not always necessary. As already mentioned above for a newly manufactured rotor blade unit, the measuring device is in particular adapted to determine the torsion or twist of rotor blade unit 10 about a particular axis, such as, for example, the stacking axis or the longitudinal axis. In this connection, it is possible, in particular, to determine whether a loss of twist has been caused in an inspected blade by the operation of the gas turbine. Contact surface 30 is preferably configured as a flat surface, so that the required measurements can be performed on rotor blade unit 10 or rotor blade 12 by means of contact surface 30. In particular, after contact surface 30 has been cleaned and, possibly, reworked, it does not have any deformations, deposits, or the like, resulting from operation.

It is also conceivable that, in the course of maintenance procedures, existing contact surfaces, which may be present, for example, at the aft side of the outer shroud of the rotor blade unit may be left unchanged, and a new contact or reference surface may be created, in particular at the forward side of the outer shroud, in accordance with the proposed method.

LIST OF REFERENCE NUMERALS 10 rotor blade unit
12 rotor blade
14 outer shroud
16 pressure side
18 leading edge
20 trailing edge
22 transition region
24 transition region 26 forward side
28 aft side
30 contact surface
30a contact surface
32 step
AB1 distance
AB2 distance
AR axial direction
RR radial direction
UR circumferential direction
LA longitudinal axis of rotor blade unit 10

What is claimed is:

1. A method for inspecting a rotor blade unit of a gas turbine, the rotor blade unit including a radially outwardly disposed outer shroud connected by a material-to-material bond to a radially inwardly adjoining rotor blade, the rotor blade having an airfoil including a pressure side and a suction side, as well as an axial leading edge and an axial trailing edge interconnecting the pressure side and the suction side, the method comprising the following steps:
   providing a rotor blade unit;
   selecting a side to be processed, the side being an axially forward or axially aft side determined to have a greater distance from the adjacent axial leading edge or axial trailing edge of the rotor blade;
   processing the outer shroud at the selected side, a contact surface being formed by processing the selected side;
   providing the rotor blade unit having the contact surface in a measuring device; and
   determining a torsion or twist of the rotor blade unit about an axis using the measuring device; wherein a non-selected side of the outer shroud remains unprocessed.

2. The method as recited in claim 1 wherein the contact surface is formed on the axially forward side of the outer shroud.

3. The method as recited in claim 1 wherein the processing of the outer shroud is performed using a machining process.

4. The method as recited in claim 3 wherein the machining process is milling or grinding.

5. The method as recited in claim 1 wherein the outer shroud is processed in such a way that the contact surface is spaced apart from the axial leading edge of the rotor blade in the axial direction.

6. The method as recited in claim 1 wherein the method is performed during manufacturing of the gas turbine or during maintenance of the gas turbine.

7. The method as recited in claim 1 wherein the gas turbine is an aircraft gas turbine.

8. The method as recited in claim 1 wherein the axis is a stacking axis or a longitudinal axis of the rotor blade.

9. The method as recited in claim 1 wherein the outer shroud and the rotor blade are integral.

10. A rotor blade unit comprising:
    a radially outwardly disposed outer shroud connected by a material-to-material bond to a radially inwardly adjoining rotor blade, the outer shroud having an axially forward side, an axially aft side and at least one side extending axially between the axially forward side and the axially aft side, the axially forward and aft sides extending circumferentially, the rotor blade having an airfoil including a pressure side and a suction side, as well as an axial leading edge and an axial trailing edge interconnecting the pressure side and the suction side, wherein the outer shroud has a machined contact surface solely at one of the axially forward and axially aft sides, the contact surface being formed at the axially forward or axially aft side having a greater distance from an adjacent axial leading edge or axial trailing edge of the rotor blade.

11. The rotor blade unit as recited in claim 10 wherein the contact surface is formed on the axially forward side of the outer shroud.

12. The rotor blade unit as recited in claim 10 wherein the rotor blade is connected radially inwardly to a root portion.

13. The rotor blade unit as recited in claim 12 wherein the root portion is configured as a fir-tree root and adapted to connect the rotor blade unit to a rotor disk of a gas turbine.

14. The rotor blade unit as recited in claim 12 wherein the root portion is connected by a material-to-material bond, to the rotor blade.

15. The rotor blade unit as recited in claim 10 wherein the outer shroud and the rotor blade are integral.

16. A gas turbine comprising a compressor stage and a turbine stage, the turbine stage having a turbine rotor including a plurality of rotor blade units arranged adjacent one another in the circumferential direction, and the compressor stage having a compressor rotor including a plurality of rotor blade units arranged adjacent one another in the circumferential direction, wherein the turbine rotor or the compressor rotor has at least one rotor blade unit as recited in claim 10.

17. An aircraft gas turbine comprising a gas turbine as recited in claim 16.

* * * * *